United States Patent
Doyle et al.

(10) Patent No.: US 7,066,691 B2
(45) Date of Patent: Jun. 27, 2006

(54) POWER DRILL/DRIVER

(75) Inventors: Michael C. Doyle, Baldwin, MD (US); Barry Plato, Bel Air, MD (US)

(73) Assignee: Black & Decker Inc., Newark, DE (US)

( * ) Notice: Subject to any disclaimer, the term of this patent is extended or adjusted under 35 U.S.C. 154(b) by 578 days.

(21) Appl. No.: 10/337,253

(22) Filed: Jan. 6, 2003

(65) Prior Publication Data

US 2003/0143042 A1 Jul. 31, 2003

Related U.S. Application Data

(60) Provisional application No. 60/352,045, filed on Jan. 25, 2002.

(51) Int. Cl.
 *B23B 45/02* (2006.01)
(52) U.S. Cl. ...................................... 408/124; 192/55.1
(58) Field of Classification Search ................ 408/124; 173/178, 216, 217; 192/55.1, 56.1, 56.6, 192/56.61, 56.62, 56.56; 475/286, 263
See application file for complete search history.

(56) References Cited

U.S. PATENT DOCUMENTS

| 287,635 | A | 10/1883 | Curtis |
|---|---|---|---|
| 863,224 | A | 8/1907 | Sawin |
| 1,119,387 | A | 12/1914 | Baker |
| 1,169,193 | A | 1/1916 | Ramelli |
| 1,727,849 | A | 9/1929 | Wise et al. |
| 2,794,155 | A | 5/1957 | Jones |
| 2,797,564 | A | 7/1957 | Bonneau et al. |
| 3,079,814 | A | 3/1963 | Nickstadt |
| 3,319,494 | A | 5/1967 | Ulbing |
| 3,334,276 | A | 8/1967 | Bateman et al. |
| 3,476,963 | A | 11/1969 | Feldhoff et al. |
| 3,599,047 | A | 8/1971 | Magarian |
| 3,675,085 | A | 7/1972 | Stanback |
| 3,748,654 | A | 7/1973 | Sutherland |
| 4,131,039 | A | 12/1978 | Garconnet |
| 4,231,270 | A | 11/1980 | Totsu |
| 4,331,012 | A | 5/1982 | Swisher |
| 4,448,098 | A | 5/1984 | Totsu |
| 4,520,423 | A | 5/1985 | Sutherland |
| 4,522,270 | A | 6/1985 | Kishi |
| 4,603,273 | A | 7/1986 | McDonald |

(Continued)

FOREIGN PATENT DOCUMENTS

DE 33 03 732 8/1984

(Continued)

*Primary Examiner*—Boyer D. Ashley
*Assistant Examiner*—J Williams
(74) *Attorney, Agent, or Firm*—Harness, Dickey & Pierce, P.L.C.

(57) ABSTRACT

A hand-held power tool having a multi-speed transmission and a clutch. The multi-speed transmission and the clutch are coupled to one another via a set of interconnecting tabs that are slidingly engaged to one another and secured with pins to inhibit the withdrawal of the tabs from one another. The clutch may include a clutch member, a unitarily formed clutch plate and a plurality of engagement members. The clutch plate includes an annular plate member and a plurality of leg members that extend generally perpendicularly from the annular plate member and which bias the engagement members into engagement with the clutch member. The clutch member may be coupled to an element of the multi-speed transmission, such as to the ring gear of a planetary gear set, so as to reduce the overall size of the power tool.

18 Claims, 10 Drawing Sheets

U.S. PATENT DOCUMENTS

| | | | |
|---|---|---|---|
| 4,606,443 A | 8/1986 | Kimura | |
| 4,614,134 A | 9/1986 | Bohle | |
| 4,655,729 A | 4/1987 | Kottke | |
| 4,678,452 A | 7/1987 | Nelson et al. | |
| 5,059,843 A | 10/1991 | Ishimoto et al. | |
| 5,287,029 A | 2/1994 | Krouse | |
| 5,356,350 A | 10/1994 | Schreiber | |
| 5,551,917 A | 9/1996 | Wood | |
| 5,551,927 A | 9/1996 | Enzmann et al. | |
| 5,565,719 A | 10/1996 | Kuhlmann | |
| 5,690,577 A | 11/1997 | Enzmann et al. | |
| 5,732,805 A | 3/1998 | Nakamura | |
| 5,878,823 A | 3/1999 | Hendricksson | |
| 5,897,454 A * | 4/1999 | Cannaliato | 475/265 |
| 5,932,945 A | 8/1999 | Volz et al. | |
| 6,007,277 A * | 12/1999 | Olson et al. | 408/35 |
| 6,010,426 A | 1/2000 | Nakamura | |
| 6,062,114 A | 5/2000 | Rahm | |
| 6,109,145 A | 8/2000 | Habermehl | |
| 6,132,435 A | 10/2000 | Young | |
| 6,142,243 A | 11/2000 | Mayer | |
| 6,213,695 B1 | 4/2001 | Breitenmoser | |
| 6,312,339 B1 | 11/2001 | Beyert | |
| RE37,905 E * | 11/2002 | Bourner et al. | 173/48 |
| 6,523,658 B1 | 2/2003 | Furuta et al. | |
| 6,676,557 B1 * | 1/2004 | Milbourne et al. | 475/286 |
| 2004/0003933 A1 * | 1/2004 | Milbourne | 173/178 |

FOREIGN PATENT DOCUMENTS

| | | |
|---|---|---|
| DE | 35 37 254 | 4/1987 |
| DE | 35 40 605 | 5/1987 |
| DE | 38 07 308 | 9/1989 |
| DE | 41 05 405 | 9/1991 |
| DE | 39 18 595 | 1/1993 |
| DE | 42 11 316 | 10/1993 |
| DE | 44 46 884 | 6/1995 |
| DE | 195 07 558 | 9/1995 |
| DE | 196 46 863 | 5/1998 |
| DE | 44 33 584 | 8/1998 |
| DE | 197 30 356 | 1/1999 |
| DE | 198 49 071 | 4/2001 |
| EP | 0 982 103 | 8/1998 |
| EP | 1 129 819 | 1/2001 |
| FR | 2505-572 | 5/1981 |
| WO | WO 97/33721 | 9/1997 |
| WO | WO 9/16585 | 4/1999 |
| WO | WO 99/59756 | 11/1999 |

* cited by examiner

POWER DRILL/DRIVER

CROSS-REFERENCE TO RELATED APPLICATIONS

This application claims the benefit of U.S. Provisional Application No. 60/352,045, filed Jan. 25, 2002.

FIELD OF THE INVENTION

The present invention generally relates to power tools such as rotatable drills, power screwdrivers, and rotatable cutting devices. More specifically, the present invention relates to improvements in power tools and more particularly to the construction of a clutch mechanism and its coupling to a transmission.

BACKGROUND OF THE INVENTION

Modernly, manufacturers of power tools desire to reduce the cost of producing power tools by providing designs that provide the product with a high level of robustness while reducing complexity at the assembly level and minimizing components that do not add value to the product. Manufacturers are further challenged by the demand of modern consumers for tools that are relatively smaller in size, lighter in weight and more powerful.

Accordingly, it is highly desirable to eliminate threaded fasteners from the power tool, such as those that are typically employed to couple the transmission assembly to the clutch mechanism. The use of threaded fasteners in these situations necessitates the incorporation of bosses to the transmission assembly and the clutch mechanism that tend to enlarge the size of the tool and which add a degree of weight to the power tool. The fastening process itself tends to be relatively slow and errors in the process, such as over tightening, which can lead to the stripping of threads or cracking of the components, or under tightening, which can create an interference that prevents the components from operating properly, are possible. The use of torque controlled fastening equipment is known to alleviate such processing errors, but this equipment can be relatively expensive to purchase and operate.

It is also desirable to better integrate the clutch mechanism with the transmission assembly. Many of the known power tool designs employ a modular design that is based on a power tool having no torque controlled clutch. In cases where precise torque control was needed, a clutch module could be coupled to the output end of the base tool. While configuration in this manner effectively accommodated consumer demands for both the base and torque controlled models in an economical manner, the modular configuration tended to add considerable length and weight to the power tool.

SUMMARY OF THE INVENTION

In one preferred form, the present invention provides a coupling mechanism for coupling the components of a power tool, such as a transmission assembly and a clutch mechanism. The coupling mechanism includes a first structure, such as a gear case, having at least one fastening tab that defines a coupling recess. The coupling mechanism also includes a second structure, such as a clutch sleeve, having an aperture for receiving a part of the first structure, and at least one outboard tab for receiving the fastening tab or tabs. The outboard tab(s) include a pin aperture that is aligned to the coupling recess when the first and second structures are fitted together. A pin is placed into each pin aperture and an associated coupling recess and operates to lock the fastening tab within the outboard tab to thereby inhibit relative movement between the first and second structures.

In another preferred form, the present invention provides a power tool having an improved clutch mechanism for limiting the torsional output of a transmission assembly. The clutch mechanism includes a clutch member that is fixedly coupled to a portion of the transmission assembly, such as the ring gear of a planetary-type reduction gear set. The clutch member includes a contoured clutch face against which a rotation-inhibiting element is biased. The torsional output of the transmission assembly is limited by the force that is exerted by the rotation-inhibiting element onto the clutch face. When the torque that is exerted on the portion of the transmission assembly exceeds a predetermined magnitude, the clutch member, along with the portion of the transmission assembly, rotates relative to the rotation inhibiting element to thereby limit the torsional output of the power tool.

In yet another preferred form, the present invention provides an improved clutch mechanism. The clutch mechanism includes a unitarily formed clutch plate having an annular plate member and a plurality of legs that extend outwardly from the annular plate member toward a clutch member. The opposite end of the legs may be contoured to receive force-transmitting elements, such as bearing balls, which are employed to transmit a biasing force to the clutch member to bias the clutch member in a stationary condition. Alternatively, the opposite ends of the legs may be contoured to act as force transmitting elements.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

Additional advantages and features of the present invention will become apparent from the subsequent description and the appended claims, taken in conjunction with the accompanying drawings, wherein:

DETAILED DESCRIPTION OF THE PREFERRED EMBODIMENTS

Figure 1:
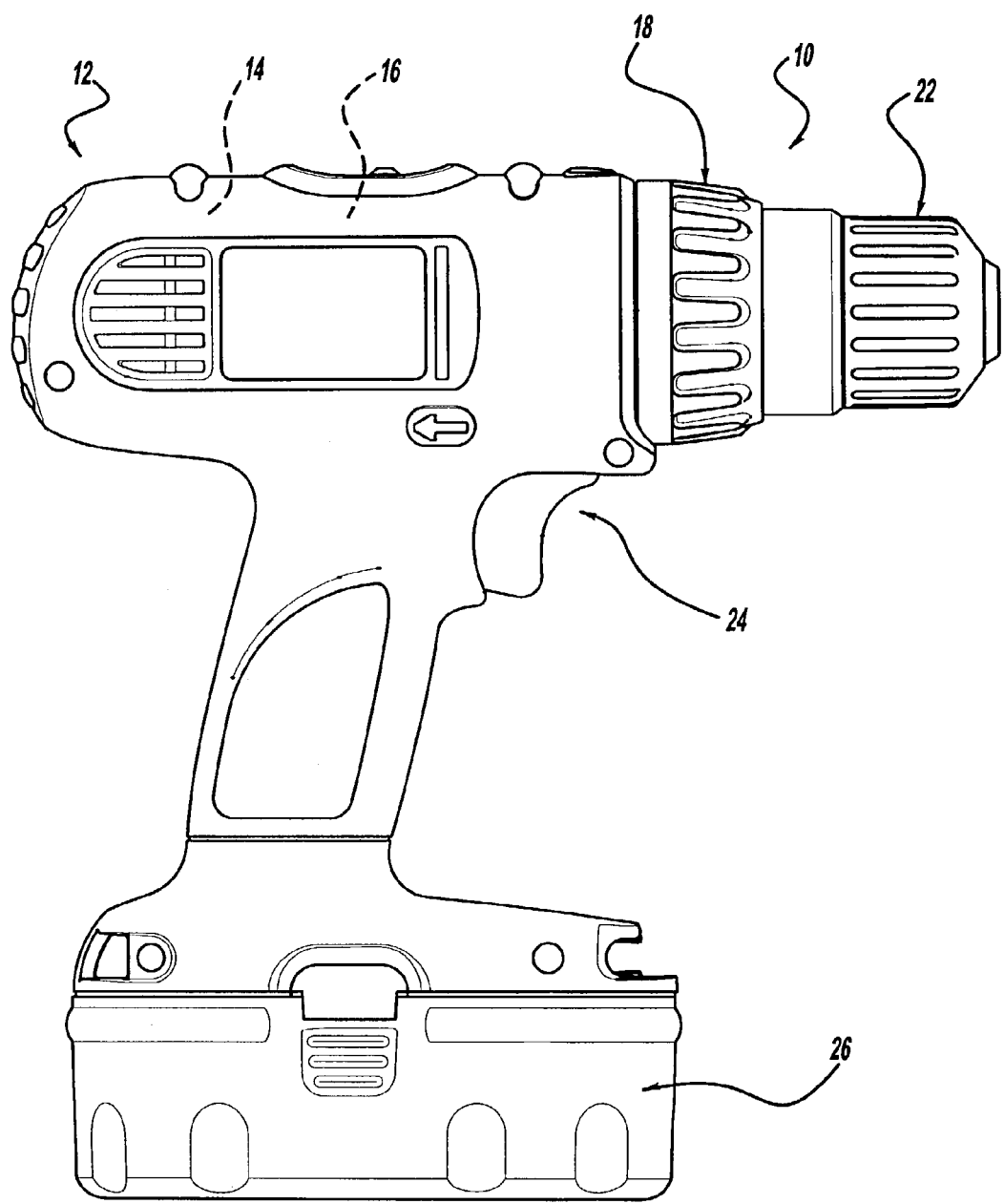
FIG. 1 is a side view of a power tool constructed in accordance with the teaching of the present invention.
Figure 2:
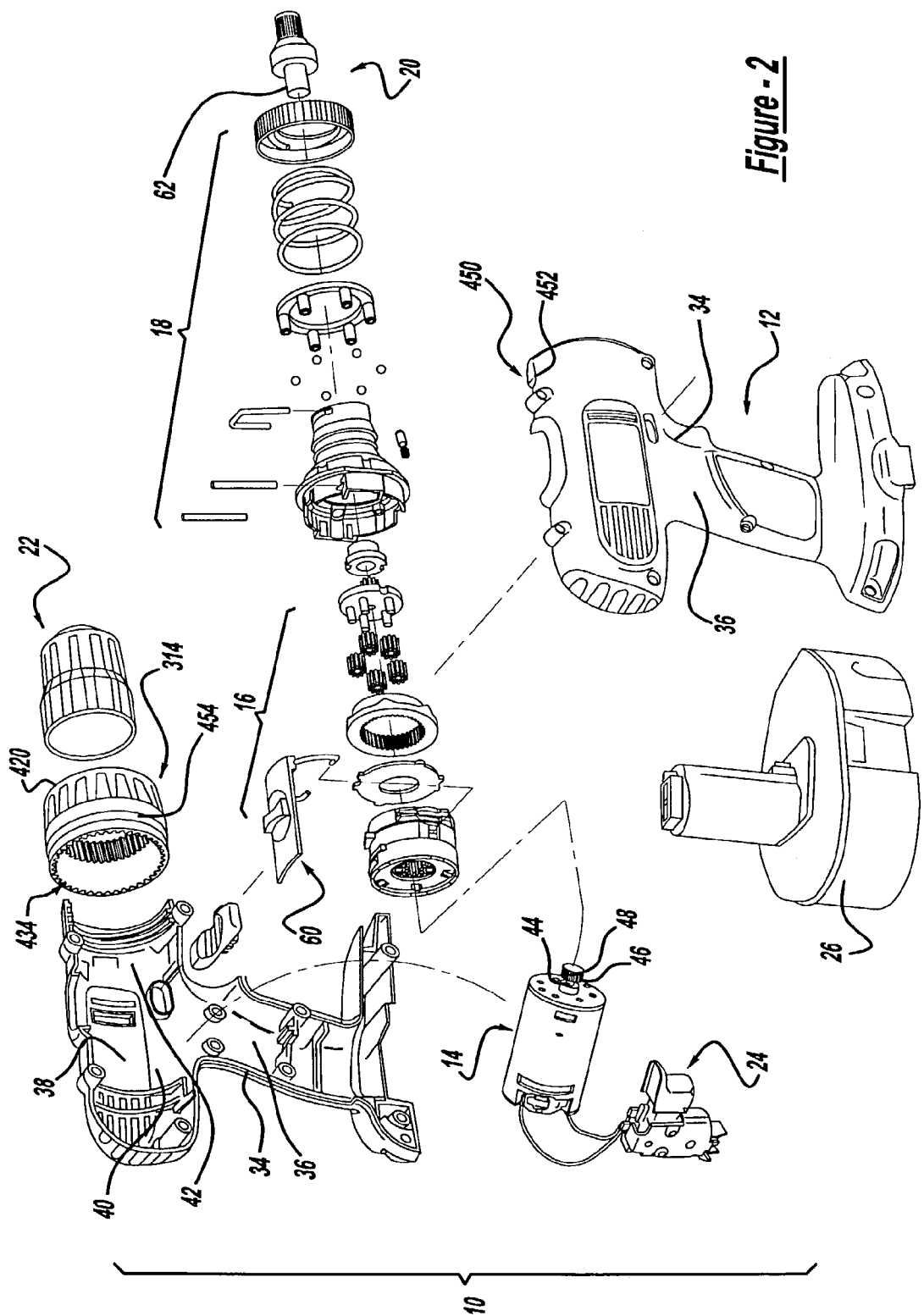
FIG. 2 is an exploded perspective view of a portion of the power tool of FIG. 1.

With reference to FIGS. 1 and 2 of the drawings, a power tool constructed in accordance with the teachings of the present invention is generally indicated by reference numeral 10. As those skilled in the art will appreciate, the preferred embodiment of the present invention may be either a cord or cordless (battery operated) device, such as a portable screwdriver or drill. In the particular embodiment illustrated, the power tool 10 is a cordless drill having a housing 12, a motor assembly 14, a multi-speed transmission assembly 16, a clutch mechanism 18, an output spindle assembly 20, a chuck 22, a trigger assembly 24 and a battery pack 26. Those skilled in the art will understand that several of the components of the power tool 10, such as the chuck 22, the trigger assembly 24 and the battery pack 26, are conventional in nature and therefore need not be discussed in significant detail in the present application. Reference may be made to a variety of publications for a more complete understanding of the conventional features of the power tool 10. One example of such publications is U.S. Pat. No. 5,897,454 issued Apr. 27, 1999, the disclosure of which is hereby incorporated by reference as if fully set forth herein.

The housing 12 includes a pair of mating handle shells 34 that cooperate to define a handle portion 36 and a drive train or body portion 38. The trigger assembly 24 and the battery pack 26 are mechanically coupled to the handle portion 36 and electrically coupled to the motor assembly 14 in a conventional manner that is not specifically shown but which is readily the capabilities of one having an ordinary level of skill in the art. The body portion 38 includes a motor cavity 40 and a transmission cavity 42. The motor assembly 14 is housed in the motor cavity 40 and includes a rotatable output shaft 44, which extends into the transmission cavity 42. A motor pinion 46 having a plurality of gear teeth 48 is coupled for rotation with the output shaft 44. The trigger assembly and battery pack 26 cooperate to selectively provide electric power to the motor assembly 14 in a manner that is generally well known in the art so as to permit the user of the power tool 10 to control the speed and direction with which the output shaft 44 rotates.

The transmission assembly 16 is housed in the transmission cavity 42 and includes a speed selector mechanism 60. The transmission assembly 16 receives a rotary input from the motor pinion 46 and converts that input to a relatively lower speed, higher torque output that is transmitted to the shaft 62 of the output spindle assembly 20. The transmission assembly 16 includes a plurality of reduction elements that are selectively engaged by the speed selector mechanism 60 to provide a plurality of speed ratios. Each of the speed ratios multiplies the speed and torque of the drive input in a predetermined manner, permitting the output speed and torque of the transmission assembly 16 to be varied in a desired manner between a relatively low speed, high torque output and a relatively high speed, low torque output. Rotary power output from the transmission assembly 16 is transmitted to the output spindle assembly, to which the chuck 22 is coupled for rotation, to permit torque to be transmitted to a tool bit (not shown). The clutch mechanism 18 is coupled to the transmission assembly and is operable for limiting the magnitude of the torque associated with the output of the transmission assembly 16 to a predetermined, selectable torque limit.

Transmission Assembly

Figure 3:
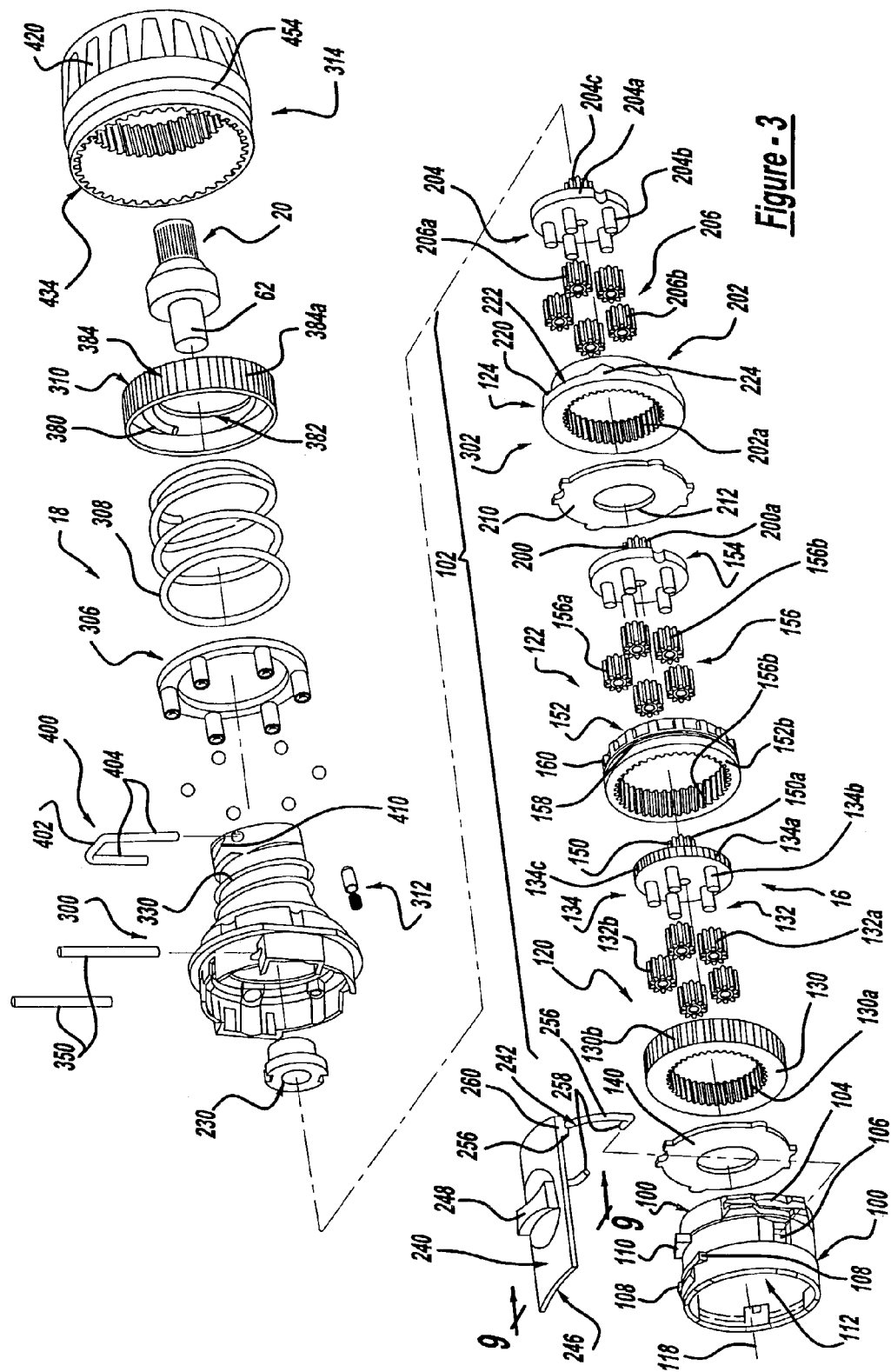
FIG. 3 is an enlarged view of a portion of FIG. 2 illustrating the transmission assembly and the clutch mechanism in greater detail.

With additional reference to FIG. 3, the transmission assembly 16 is illustrated to further include a gear case 100 that houses a three-stage, two-speed gear train 102. With additional reference to FIG. 4, the gear case 100 is shaped in a generally hollow cylindrical manner and includes a fastening tab 104 and a clip aperture 106 on each of its lateral sides, a pair of guide rails 108 and a guide tab 110 that is located on its top surface, and a central cavity 112 that extends longitudinally through the gear case 100. Each fastening tab 104 terminates at its outward face at a coupling recess 114 that extends in a direction that is generally transverse to the central cavity 112. The coupling recess 114 is preferably arcuately shaped, and in the particular embodiment illustrated, is illustrated to be generally U-shaped. Each clip aperture 106 extends through the wall 116 of the gear case 100 along the longitudinal axis 118 of the central cavity 112 and intersects the central cavity 112. The guide rails 108 positioned rearwardly of the guide tab 110 and are spaced laterally apart from one another. The guide rails 108 and the guide tab 110 will be discussed in further detail, below.

The gear train 102 is illustrated to be a planetary type gear train, having a first planetary gear set 120, a second planetary gear set 122 and a third planetary gear set 124. In the example provided, each of the first, second and third gear sets 120, 122 and 124 are operable in an active mode, wherein the gear set performs a speed reduction and torque multiplication operation, while the second planetary gear set 122 is also operable in an inactive mode, wherein it provides a rotary output having a speed and torque that is about equal to that which is input to it.

The first planetary gear set 120 includes first ring gear 130, a first set of planet gears 132 and a first reduction carrier 134. The first ring gear 130 is an annular structure, having a plurality of gear teeth 130a that are formed about its interior diameter and a plurality of gear case engagement teeth 130b that are formed onto its outer perimeter. With additional reference to FIG. 5, the first ring gear 130 is disposed within the central cavity 112 of the gear case 100 such that the gear case engagement teeth 130b engage mating teeth 130c formed on the inner surface of the gear case 100 to inhibit relative rotation between the first ring gear 130 and the gear case 100. As the gear case engagement teeth 130b terminate prior to the rear face 130d of the first ring gear 130, forward movement of the first ring gear 130 is halted by interference between the mating teeth 130c that are formed on the inner surface of the gear case 100 and the portion of the first ring gear 130 that is disposed rearwardly of the gear case engagement teeth 130b.

Figure 7:
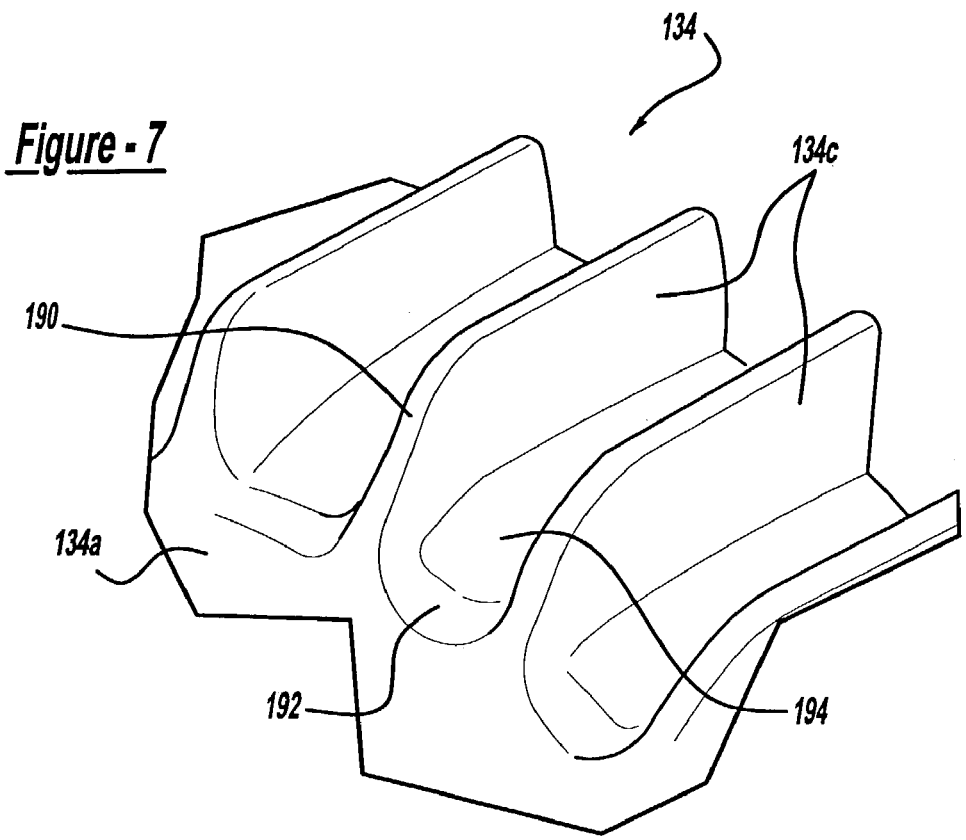
FIG. 7 is a perspective view of a portion of the transmission assembly illustrating the contour of the top and rear surfaces of the second reduction carrier.
Figure 8:
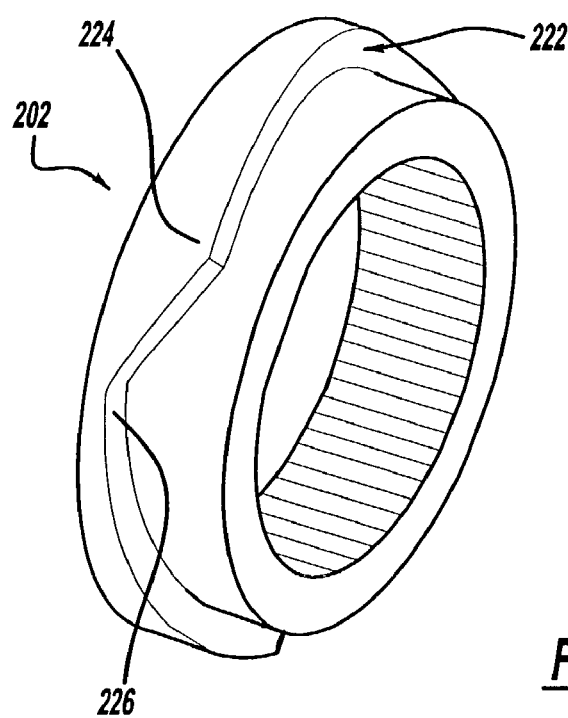
FIG. 8 is a perspective view of a portion of the transmission assembly illustrating the third ring gear in greater detail.

The first reduction carrier 134 includes a body 134a, which is formed in the shape of a flat cylinder and a plurality of cylindrical pins 134b that extend from the rearward face of the body 134a, and a plurality of 134c A plurality of gear teeth 134c are formed into the outer perimeter of the body 134a and are sized to engage the gear teeth 152a of the second ring gear 152. With reference to FIG. 7, the profile of the gear teeth 134c of the body 134a is illustrated in greater detail. As shown, each tooth 134c terminates at a gradual radius 190 at the forward face of the body 134a but terminates abruptly at the rearward face of the body 134a. A radius 192 is also formed on the valleys 194 between the gear teeth 134c. The first set of planet gears 132 includes a plurality of planet gears 132a, each of which being generally cylindrical in shape and having a plurality of gear teeth 132b formed onto its outer perimeter and a pin aperture (not specifically shown) formed through its center. Each planet gear 132a is rotatably supported on an associated one of the pins 132b of the first reduction carrier 134 and is positioned to be in meshing engagement with the gear teeth of the first ring gear 130. A first annular thrust washer 140 is fitted to the end of the gear case 100 proximate the motor assembly 14 and prevents the planet gears 132 from moving rearwardly and disengaging the pins 134b of the first reduction carrier 134. A raised portion 142 is formed onto the front and rear faces of each planet gear 132 to inhibit the gear teeth 132b of the planet gears 132 from rubbing on the first reduction carrier 134 and the first thrust washer 140. The teeth 46a of the motor pinion 46 are also meshingly engaged with the teeth 132b of the planet gears 132 and as such, the motor pinion 46 serves as the first sun gear for the first planetary gear set 120.

The second planetary gear set 122 is disposed within the central cavity 112 forward of the first planetary gear set 120 and includes a second sun gear 150, a second ring gear 152, a second reduction carrier 154 and a second set of planet gears 156. The second sun gear 150 is fixed for rotation with the first reduction carrier 134 and includes a plurality of gear teeth 150a that extend forwardly from the flat, cylindrical portion of the first reduction carrier 134.

Figure 6:
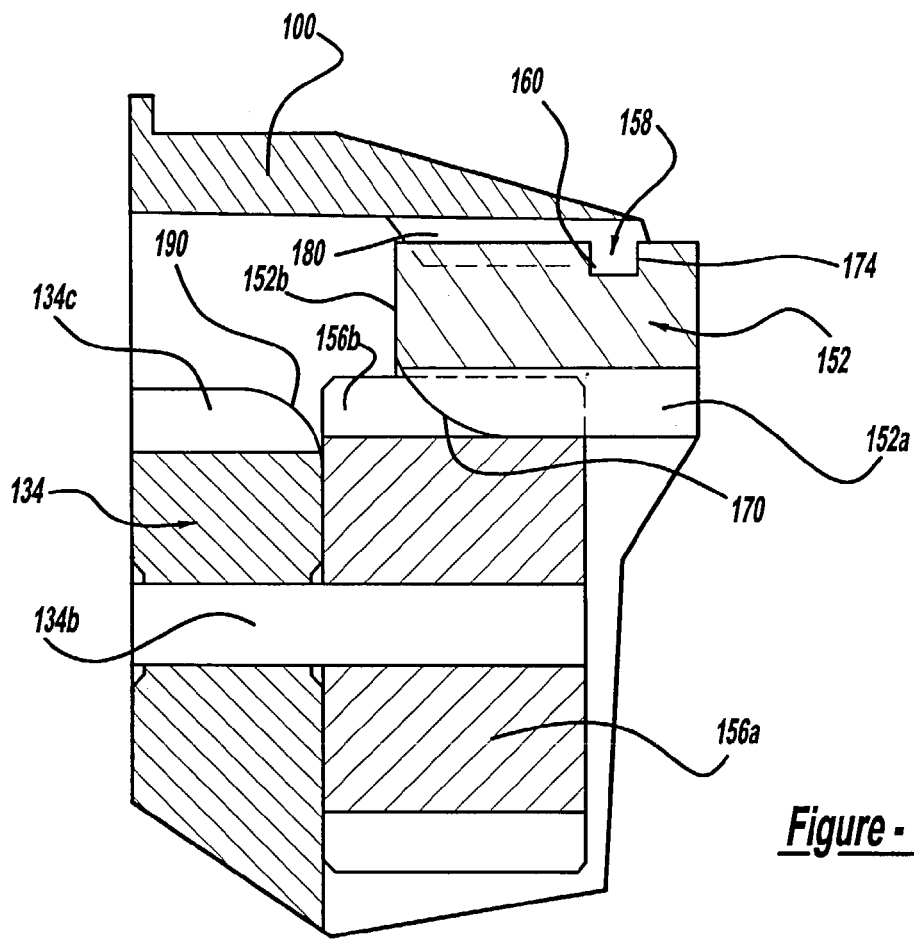
FIG. 6 is a sectional view of a portion of the transmission assembly illustrating the second planetary gear set in the active position.

The second ring gear 152 is an annular structure having a plurality of gear teeth 152a formed about its interior diameter, an annular clip groove 158 formed into its outer perimeter and a plurality of gear case engagement teeth 160 that are formed onto its outer perimeter. The gear teeth 152a may be heavily chamfered at the rear face 152b of the second ring gear 152 but terminate abruptly its front face. More preferably, a heavy radius 170 is formed onto the rear face 152b and the sides of each of the gear teeth 152a as illustrated in FIG. 6, with the heavy radius 170 being employed rather than the heavy chamfer as the heavy radius 170 on the gear teeth 152a provides for better engagement between the second ring gear 152 and the second reduction carrier 154, as will be described in more detail, below. In the example illustrated, the clip groove 158 is a rectangular slot having a pair of sidewalls 174. The clip groove 158 will be discussed in further detail, below.

Figure 5:
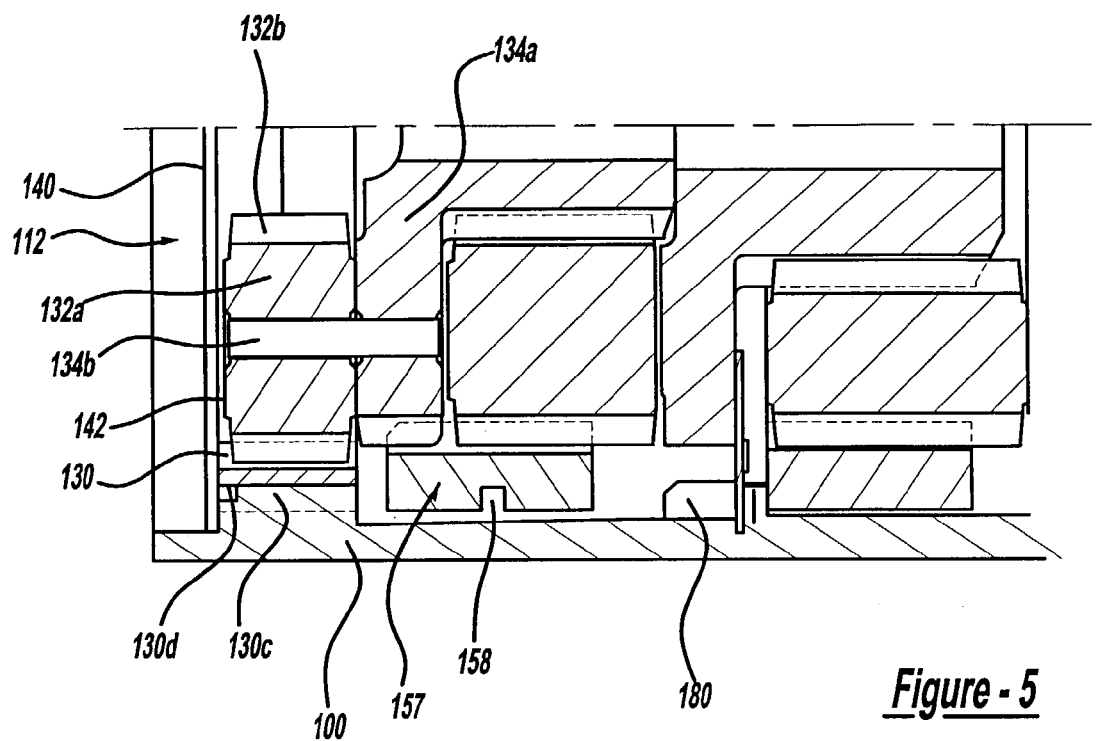
FIG. 5 is a sectional view of a portion of the power tool of FIG. 1 taken along the longitudinal axis of the power tool and illustrating the construction of the transmission assembly.

The second ring gear 152 is movably disposed within the central cavity 112 of the gear case 100 between a first position as shown in FIG. 6, wherein the gear case engagement teeth 160 engage mating teeth 180 formed on the inner surface of the gear case 100 to inhibit relative rotation between the second ring gear 152 and the gear case 100, and a second position as shown in FIG. 5, wherein the gear case engagement teeth 160 are axially spaced apart from the mating teeth 180 to thereby permit relative rotation between the second ring gear 152 and the gear case 100.

The second reduction carrier 154 includes a body 154a, which is formed in the shape of a flat cylinder, and plurality of pins 154b that extend from the rearward face of the body 154a.

Referring back to FIGS. 3 and 5, the second set of planet gears 156 is shown to include a plurality of planet gears 156a, each of which being generally cylindrical in shape and having a plurality of gear teeth 156b and a pin aperture (not specifically shown) in its center. Each planet gear 156a is supported for rotation on an associated one of the pins 154b of the second reduction carrier 154 and is positioned such that the gear teeth 156b are in meshing engagement with gear teeth 152a of the second ring gear 152.

The third planetary gear set 124 is disposed on the side of the second planetary gear set 122 opposite the first planetary gear set 120. Like the second planetary gear set 122, the third planetary gear set 124 includes a third sun gear 200, a third ring gear 202, a third reduction carrier 204 and a third set of planet gears 206. The third sun gear 200 is fixed for rotation with the body 154a of the second reduction carrier 154 and includes a plurality of gear teeth 200a that extend forwardly from the body 154a. An annular second thrust washer 210 is disposed between the second ring gear 152 and the third ring gear 202 and operates to limit the forward movement of the second ring gear 152 and the rearward movement of the third ring gear 202 and the third set of planet gears 206. The second thrust washer 210, which includes an aperture 212 through which the third sun gear 200 extends, engages the inner surface of the gear case 100.

The third ring gear 202 is an annular structure having a plurality of gear teeth 202a formed about its interior diameter and an outer radial flange 220 that forms its outer perimeter. A clutch face 222 is formed into the forward surface of the outer radial flange 220. In the particular embodiment illustrated, the clutch face 222 is shown to have an arcuate cross-sectional profile and is further defined by a plurality of peaks 224 and valleys 226 that are arranged relative to one another to form a series of ramps that are defined by an angle of about 18°. Those skilled in the art will understand, however, that clutch faces of other configurations, such as those having a sinusoidal shape, may also be employed. Those skilled in the art will also understand that while the clutch face 222 is shown to be unitarily formed with the third ring gear 202, multi-component configurations may also be employed. Such multi-component configurations include, for example, an annular clutch face ring (not shown) having a rearward facing first side for engaging the third ring gear 202 and a forward facing second side that forms the clutch face 222. Configuration in this latter manner may be advantageous, for example, when it is necessary for the clutch face 222 to have properties or characteristics (e.g., lubricity, hardness, toughness, surface finish) that are different from the properties or characteristics of the third ring gear 202.

The third reduction carrier 204 includes a body 204a, which is formed in the shape of a flat cylinder, and a plurality of cylindrical pins 204b, which extend from the rearward face of the body 204a, and a coupling portion 204c that extends from the forward face of the body 204a. Rotary power transmitted to the third reduction carrier 204 is transmitted through the coupling portion 204c to a coupling member 230 that engages the shaft 62of the output spindle assembly 20. Those skilled in the art will understand that various other coupling devices and methods may be utilized to couple the third reduction carrier 204 to the output spindle assembly 20, such as a direct coupling of the shaft 62 of the output spindle assembly 20 to the body 204a of the third reduction carrier 204.

The third set of planet gears 206 includes a plurality of planet gears 206a, each of which being generally cylindrical in shape and having a plurality of gear teeth 206b formed onto its outer perimeter and a pin aperture (not specifically shown) formed through its center. Each planet gear 206a is rotatably supported on an associated one of the pins 204b of the third reduction carrier 204 and is positioned to be in meshing engagement with the gear teeth 202a of the third ring gear 202.

Figure 9:
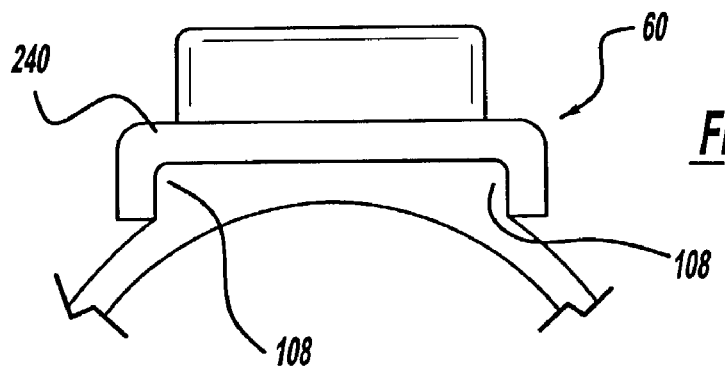
FIG. 9 is a sectional view taken along the line 9—9 of FIG. 3.
Figure 10:
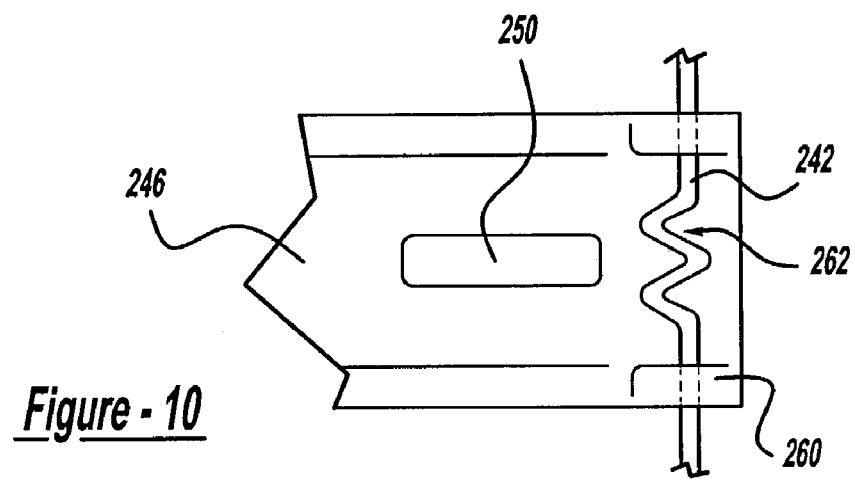
FIG. 10 is a partial bottom view of a portion of the transmission assembly illustrating the speed selector mechanism in greater detail.

The speed selector mechanism 60 is illustrated to include a slider body 240 and a clip structure 242. The slider body 240 is an elongated structure that is configured to be housed between the handle shells 34 and selectively slid along the top of the gear case 100. The slider body 240 includes an attachment groove 246, which permits the clip structure 242 to be attached to the slider body 240, and a selector tab 248, which is configured to receive an input from the user of the power tool 10 to switch the second planetary gear set 122 between the active and inactive modes. With additional reference to FIGS. 9 and 10, a slot 250 is formed into the underside of the slider body 240 and is sized to engage the guide tab 110 that extends from the top surface of the gear case 100. The guide rails 108 are spaced laterally apart to receive the slider body 240. The guide tab 110 and the guide rails 108 cooperate with the sides of the slot 250 and the sides of the attachment groove 246, respectively, to guide the slider body 240 as the slider body 240 is moved in an axial direction along the top surface of the gear case 100.

Returning to FIG. 3, the clip structure 242 is a wire that is formed to include a circular body portion 256 and a pair of end tabs 258 that extend inwardly from the body portion 256. The body portion 256 is fixedly coupled to an attachment tab 260, which is illustrated to be a pair of trunnions that extend downwardly from the slider body 240. The body portion 256 is sized to fit over the outer circumference of the gear case 100 and preferably includes a rotation-inhibiting element 262 to inhibit the clip structure 242 from rotating relative to the attachment tab 260. In the embodiment provided, the rotation-inhibiting element 262 is illustrated to include a plurality of bends, such as M-, N-, S-, or Z-shaped bends, that are formed into the wire and which are molded into or abut the underside of the slider body 240. Each of the end tabs 258 extends through an associated one of the clip apertures 106 in the sides of the gear case 100 and engages the annular clip groove 158 that is formed into the perimeter of the second ring gear 152. The wire that forms the clip structure 242 is somewhat smaller in diameter than the width of the clip groove 158.

Alternatively, the rotation-inhibiting element 262 may include a plurality of tabs that are formed from bends in the body portion 256 of the wire, wherein each tab is defined by a circumferentially extending segment that is offset radially outwardly from the remainder of the body portion 256. Each of the tabs is configured to be received in a corresponding aperture formed into the slider body 240 such that the front and rear faces of each tab engage the sides of the apertures in the slider body 240. The tabs, being confined within an associated aperture in the slider body 240, inhibit relative movement between the slider body 240 and the body portion 256 of the clip structure 242.

Sliding movement of the slider body 240 relative to the gear case 100 is operable for transmitting a force through the end tabs 258 of the clip structure 242 and to the second ring gear 152 which may be used to move the second ring gear 152 between the first and second positions. When the second ring gear 152 is positioned in the first position as illustrated in FIG. 6, the engagement teeth 160 of the second ring gear 152 are engaged to the mating engagement teeth 180 of the gear case 100 and the gear teeth 152a of the second ring gear 152 are engaged to only the gear teeth 156b of the planet gears 156a of the second planet gear set 156, thereby permitting the second planetary gear set 122 to operate in the active mode. When the second ring gear 152 is positioned in the second position as illustrated in FIG. 5, the engagement teeth 160 of the second ring gear 152 are not engaged to the mating engagement teeth 180 of the gear case 100 and the gear teeth 152a of the second ring gear 152 are engaged to both the gear teeth 156b of the planet gears 156a of the second planet gear set 156 and the gear teeth 134c of the first reduction carrier 134, thereby permitting the second planetary gear set 122 to operate in the inactive mode.

Clutch Mechanism

In FIG. 3, the clutch mechanism 18 is illustrated to include a clutch sleeve 300, a clutch member 302, a plurality of balls 304, a clutch plate 306, a spring 308, an adjustment collar 310, a detent mechanism 312 and a clutch cover 314. With additional reference to FIG. 4, the clutch sleeve 300 is illustrated to include a wall member 320, which defines a hollow cavity or bore 322 that extends along the longitudinal axis of the clutch sleeve 300, a base portion 324 and a nose portion 326 that extends forwardly from the base portion 324. The rearward end of the bore 322 is sized to receive a forward portion of the gear case 100, the third ring gear 202 and the third reduction carrier 204, while the forward portion of the bore 322 is sized somewhat smaller so as to receive the coupling member 230 and the shaft 62 of the output spindle assembly 20. The nose portion 326, which is somewhat smaller in diameter than the base portion 324, is generally cylindrical, having a helical thread form 330 that wraps around its perimeter.

Figure 11:
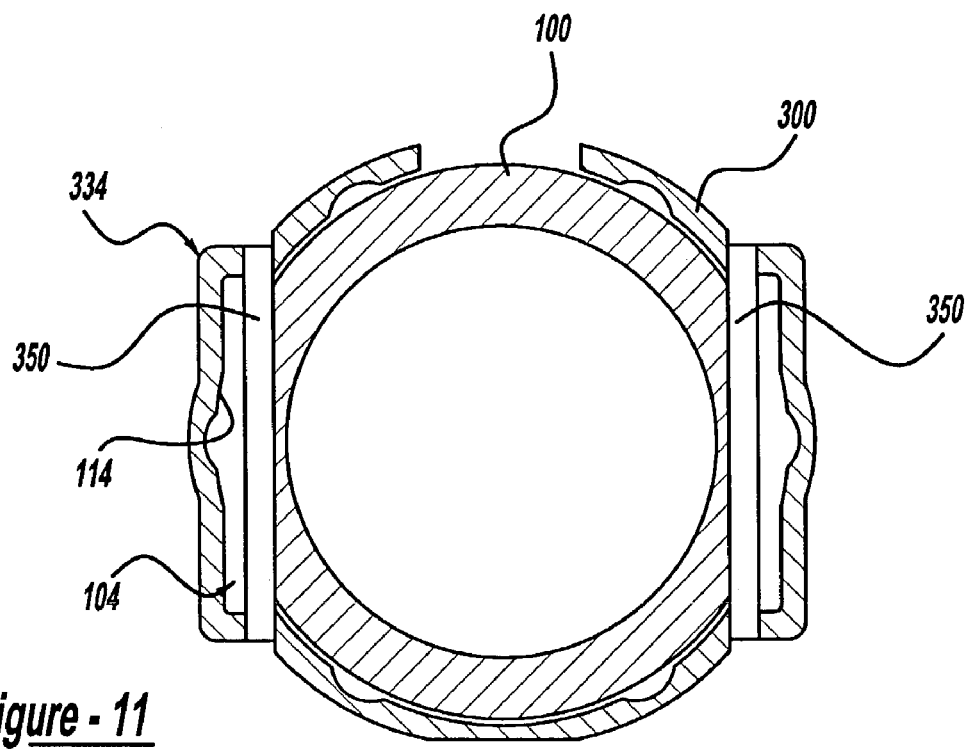
FIG. 11 is a sectional view of a portion of the power tool of FIG. 1 taken through the gear case and clutch sleeve and illustrating the method by which the transmission assembly and the clutch mechanism are coupled.

The base portion 324 includes a pair of outboard tabs 334, which are formed on the lateral sides of the base portion 324, a plurality of leg apertures 336, which extend generally perpendicular to the longitudinal axis of the bore 322, and a detent aperture 338 for receiving the detent mechanism 312. Each outboard tab 334 is configured to receive an associated one of the fastening tabs 104 and includes a pin aperture 340. In the particular embodiment illustrated, each outboard tab 334 is defined by an outer lateral wall 342, a lower wall 344, and an upper wall 346, through which the pin aperture 340 extends. With additional reference to FIG. 11, a cylindrical locking pin 350 is fitted through the pin aperture 340 in each outboard tab 334 and the coupling recess 114 in the associated fastening tab 104 and thereby fixedly but removably couples the clutch sleeve 300 to the gear case 100. The locking pins 350 are highly advantageous in that they eliminate the need for threaded fasteners, fastening tools and the use of bosses in the gear case 100 and the clutch sleeve 300 that are configured for receiving a conventional threaded fastener. The leg apertures 336 are circumferentially spaced about the nose portion 326 and extend through the base portion 324 and intersect the rearward portion of the bore 322. The detent aperture 338 extends through the base portion 324 between the clutch cover 314 and the gear case 100 and is sized to receive a portion Of the detent mechanism 312.

Figure 12:
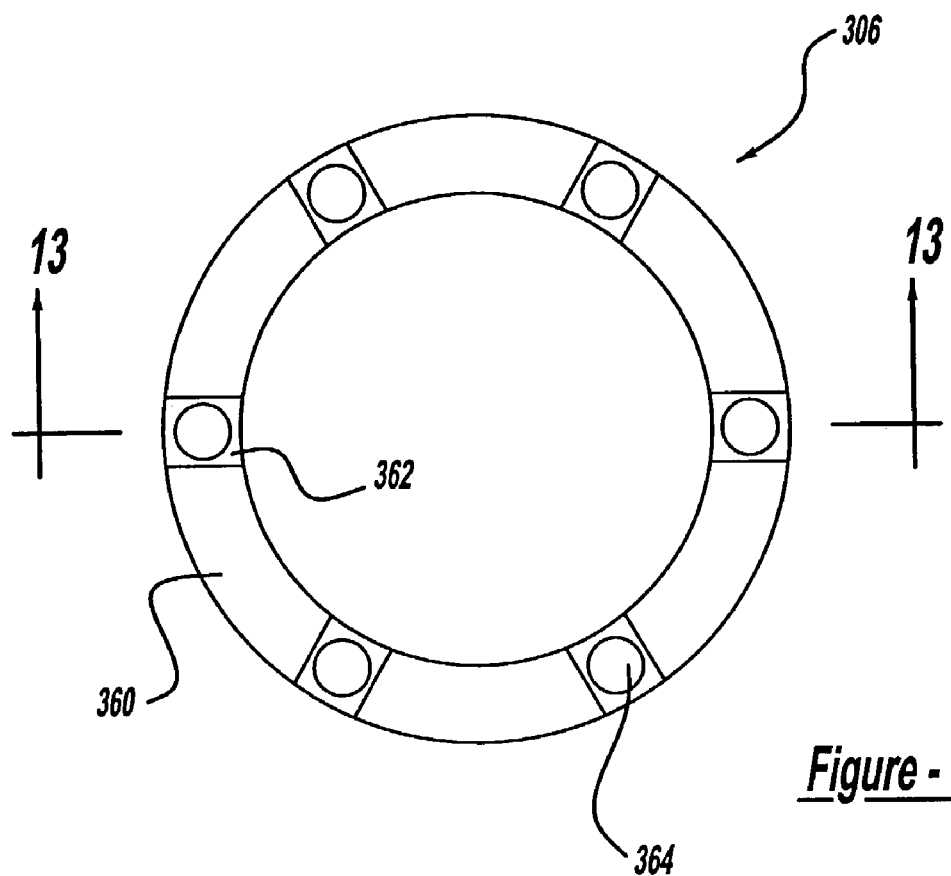
FIG. 12 is a side view of a the clutch plate.
Figure 13:
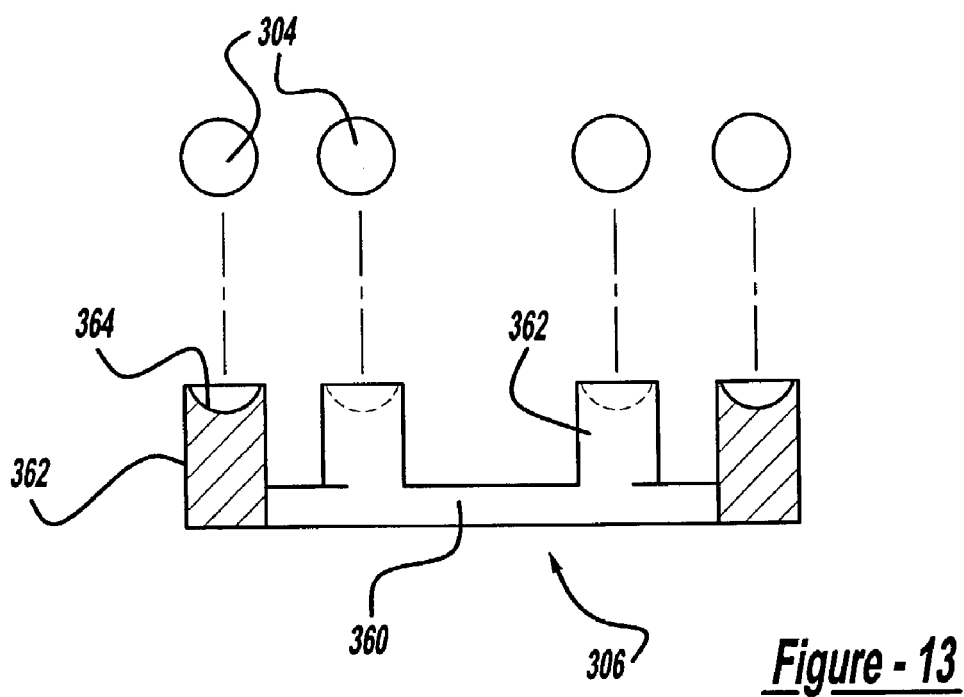
FIG. 13 is an exploded side view in partial section illustrating the clutch plate and the balls.

In FIGS. 3, 12 and 13, the clutch plate 306 is illustrated to be a unitarily formed structure that includes a washer-like annular plate member 360 and a plurality of leg members 362 that are coupled to and circumferentially spaced about the annular plate member 360. The leg members 362 have a generally circular cross-section and extend generally perpendicularly from the plate member 360. The end of the each leg member 362 opposite the plate member 360 terminates in a spherical recess 364 that is configured to receive one of the balls 304, which are illustrated to be hardened bearing balls. The clutch plate 306 is disposed over the nose portion 326 of the clutch sleeve 300 and moved axially rearward to push the leg members 362 through the leg apertures 336 in the base portion 324, as well as to bring each of the balls 304 into contact with the clutch face 222 and an associated one of the spherical recesses 364.

Figure 14:
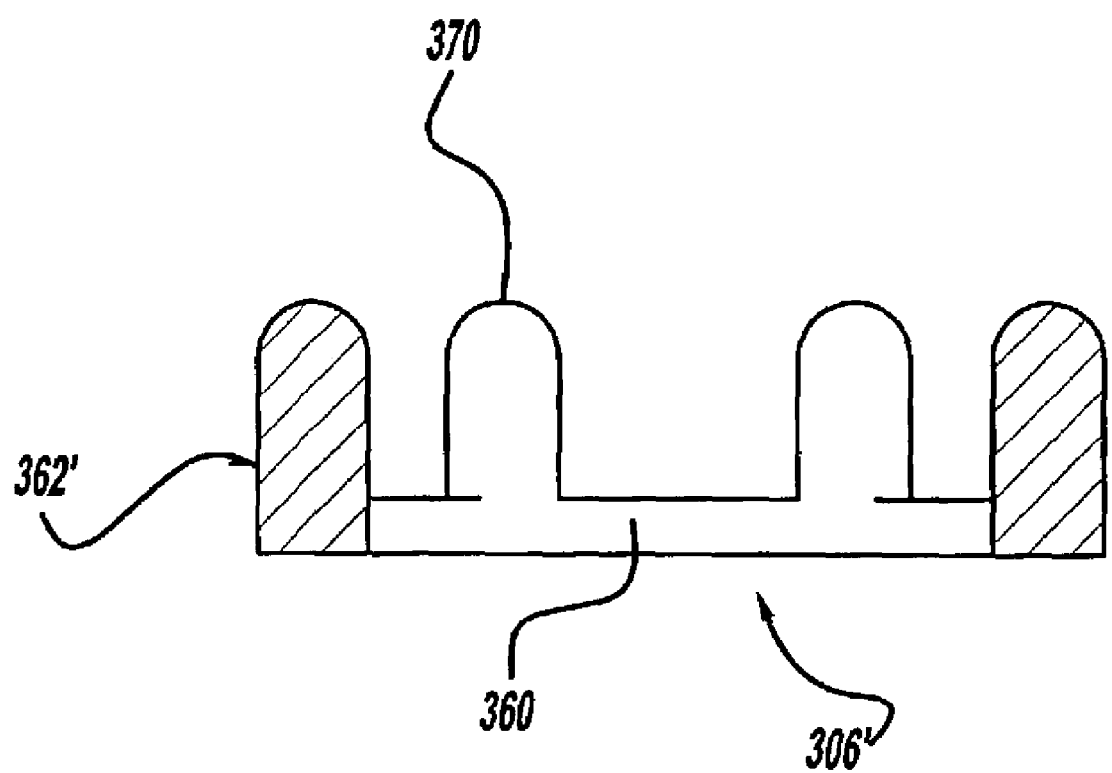
FIG. 14 is a sectional view similar to that of FIG. 13 but illustrating an alternate embodiment of the clutch plate.

In an alternate embodiment illustrated in FIG. 14, the clutch plate 306' is illustrated to be similar to the clutch plate 306, except that the ends of the leg members 362' opposite the annular plate member 360 terminate at a spherical protrusion 370, rather than a spherical recess. Configuration in this manner is advantageous in that it eliminates the balls 304 from the clutch mechanism 18.

Figure 15:
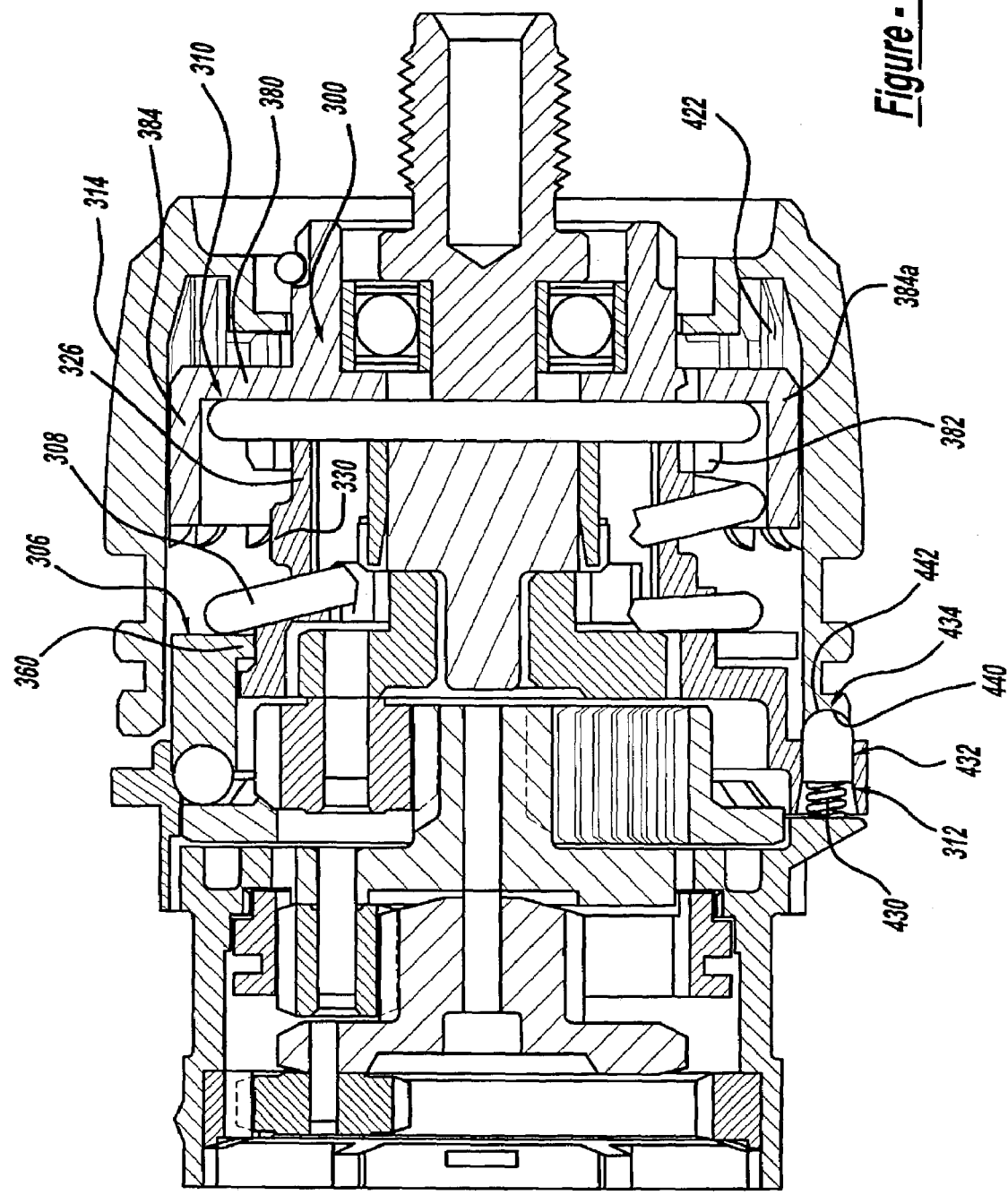
FIG. 15 is a sectional view of a portion of the power tool of FIG. 1 taken along the longitudinal axis and illustrating the clutch mechanism in greater detail.

Returning to FIG. 3 and with additional reference to FIG. 15, the spring 308 is illustrated to be a conventional compression spring having ground ends. The spring 308 is disposed over the nose portion 326 of the clutch sleeve 300 between the plate member 360 of the clutch plate 306 and the adjustment collar 310. The adjustment collar 310 is an annular structure that is illustrated to include an internal annular flange 380, a threaded portion 382 and an engagement portion 384. The internal annular flange 380 extends around the inner circumference of the adjustment collar 310 and sized somewhat smaller in diameter than the spring 308 but larger than the nose portion 326 of the clutch sleeve 300. The threaded portion 382 intersects the internal annular flange 380 and is sized to threadably engage the thread form 330 that is formed on the outer diameter of the nose portion 326. The engagement portion 384 is configured to permit the adjustment collar 310 to be rotatably coupled to the clutch cover 314 and well as to move axially within the clutch cover 314. In the example provided, the engagement portion 384 includes a plurality of engagement teeth 384a that are formed about the outer perimeter of the adjustment collar 310. The engagement teeth 384a will be described in further detail, below.

Figure 4:
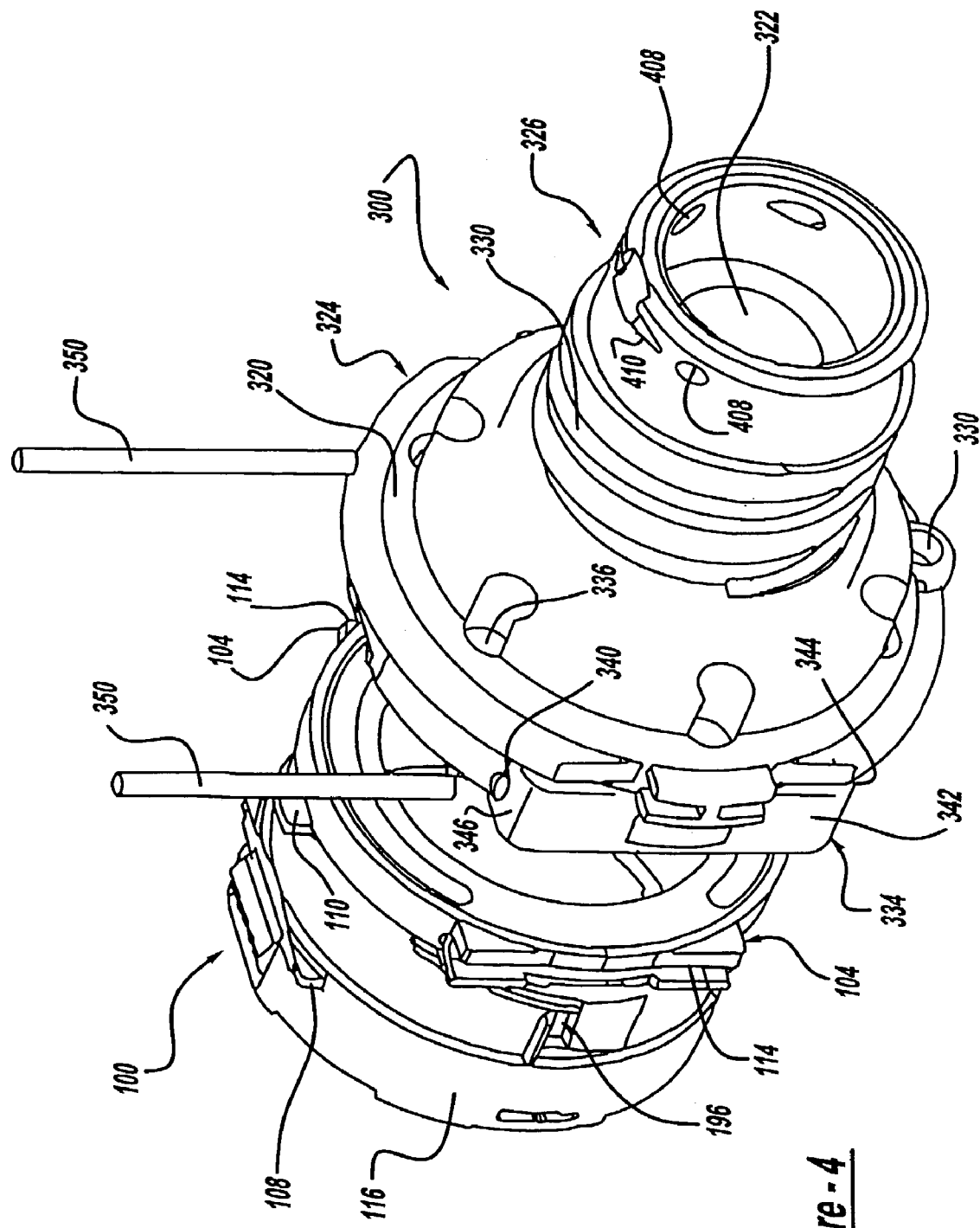
FIG. 4 is an exploded perspective view of a portion of the power tool of FIG. 1 illustrating the construction of the gear case and the clutch sleeve.

A wire clip 400 is coupled to the nose portion 326 to inhibit the removal of the adjustment collar 310 from the thread form 330. The wire clip 400 is formed in U-shape, having a base 402 that is disposed between a pair of spaced apart legs 404. Each of the legs 404 extends in a generally perpendicular direction away from the base 402. With the clutch plate 306 and spring 308 fitted over the nose portion 326 and the adjustment collar 310 engaged to the thread form 330, the wire clip 400 is fitted over the nose portion 326 generally perpendicular to the longitudinal axis of the clutch sleeve 300 such that legs 404 are engaged to leg apertures 408 in the clutch sleeve 300 and the base 402 is disposed in a shallow U-shaped recess 410 that is situated on the top surface of the nose portion 326 as best shown in FIG. 4. Engagement of the wire clip 400 into the leg apertures 408 and recess 410 operatively locks the wire clip 400 to the nose portion 326 and thereby creates a positive stop that is configured to prevent the adjustment collar 310 from being threaded out of engagement with the thread form 330 that is formed onto the nose portion 326.

The clutch cover 314 is constructed in the form of a hollow sleeve that shrouds the clutch plate 306, the spring 308, the nose portion 326 and the wire clip 400. The clutch cover 314 extends forwardly of the base portion 324 and includes a gripping surface 420 that is formed on its outer perimeter. The gripping surface 420 is contoured to permit the user of the power tool 10 to rotate the clutch cover 314 about the longitudinal axis of the power tool 10 to adjust the setting of the clutch mechanism 18 as will be discussed in greater detail, below.

A plurality of mating engagement teeth 422 are formed onto the inner diameter of the clutch cover 314 which are sized to engage the engagement teeth 384a of the adjustment collar 310. The mating engagement teeth 422 are relatively longer than the engagement teeth 384a and as such, permit the engagement teeth 384a to axially slide along the mating engagement teeth 422 along the longitudinal axis of the power tool 10 when the clutch cover 314 is rotated.

In the example provided, the detent mechanism 312 is illustrated to include a detent spring 430, a plunger 432 and a detent ring 434. The detent spring 430 and plunger 432 are housed in the detent aperture 338 that is formed through the base portion 324 of the clutch sleeve 300. The detent spring 430, which is illustrated to be a conventional compression spring, abuts the gear case 100 on a first side and a flattened end of the plunger 432 on the opposite side, thereby biasing the plunger 432 in a direction outwardly from the base portion 324. The plunger 432 includes a contact end 440, which is defined by a spherical radius in the example illustrated, and which is biased forwardly by the detent spring 430 into contact with the detent ring 434. In the particular embodiment provided, the detent ring 434 is integrally formed with the clutch cover 314 and includes a plurality of circumferentially spaced recesses or detents 442 that are sized to engage the contact end 440 of the plunger 432. Each of the detents 442 is illustrated to be defined by a spherical radius that conforms to the contact end 440. A setting indicator 450 (FIG. 2) may be employed to indicate the position of the adjustment collar 310 relative to the clutch sleeve 300. In the example provided, the setting indicator 450 includes an arrow 452 that is formed into the handle shells 34 and a scale 454 that is marked into the circumference of the clutch cover 314.

Rotation of the clutch cover 314 relative to the clutch sleeve 300 causes the adjustment collar 310 to rotate in an equivalent manner to thereby alter the amount by which the spring 308 is compressed. Interaction between the contact end 440 of the plunger 432 and the detents 442 in the detent ring 434 provide the user of the power tool 10 with feedback as to the setting of the clutch mechanism 18, as well as inhibit the clutch cover 314 from inadvertently rotating out of the position to which it has been set. The spring 308 exerts a compression force onto the annular flange 380 of the adjustment collar 310 and the plate member 360 of the clutch plate 306, driving the leg members 362 of the clutch plate 306 rearwardly and biasing the balls 304 into engagement with the clutch face 222. The balls 304 exert a counter torque onto the clutch face 222 that tends to inhibit rotation of the third ring gear 202 relative to the clutch sleeve 300.

When the power tool 10 is operated and the torque that is exerted through the gear teeth 202a of the third ring gear 202 exceeds the counter torque, the peaks 224 of the clutch face 222 ride over the balls 304 to enable the third ring gear 202 to rotate relative to the third reduction carrier 204 and greatly reduce the torque that is applied to the output spindle assembly 20.

While the invention has been described in the specification and illustrated in the drawings with reference to a preferred embodiment, it will be understood by those skilled in the art that various changes may be made and equivalents may be substituted for elements thereof without departing from the scope of the invention as defined in the claims. In addition, many modifications may be made to adapt a particular situation or material to the teachings of the invention without departing from the essential scope thereof. Therefore, it is intended that the invention not be limited to the particular embodiment illustrated by the drawings and described in the specification as the best mode presently contemplated for carrying out this invention, but that the invention will include any embodiments falling within the foregoing description.

What is claimed is:

1. A hand-held power tool comprising:
   a housing;
   a handle coupled to the housing;
   a multi-speed transmission having a gear case and a gear train, the gear case associated with the housing and housing the gear train, the gear train being operable for performing a speed reduction and torque multiplication function;
   a clutch having a clutch member, an engagement member, a clutch plate, a clutch spring and a clutch sleeve, the clutch member being associated with the multi-speed transmission and including a clutch face, the clutch spring and the clutch plate cooperating to bias the engagement member into engagement with the clutch face to resist rotation of the clutch member, the clutch sleeve supporting the clutch plate and the clutch spring;
   a pair of first tabs coupled to one of the gear case and the clutch sleeve, each of the fastening tabs defining a coupling recess that extend in a direction that is transverse to a longitudinal axis of the one of the gear case and the clutch sleeve;
   a pair of second tabs coupled to the other one of the gear case and the clutch sleeve, each second tab including a pin aperture and being configured to slidingly receive a corresponding one of the first tabs such that the pin aperture is aligned to the coupling recess; and
   a pair of pin members, each pin member being disposed into the coupling recess of an associated first tab and the pin aperture of an associated second tab to thereby inhibit withdrawal of the first and second tabs from one another.

2. The hand-held power tool of claim 1, wherein the clutch further comprises an adjustment collar threadably engaged to the clutch sleeve and wherein rotation of the adjustment collar affects an amount by which the clutch spring is compressed against the clutch plate.

3. The hand-held power tool of claim 2, wherein a pair of collar securing apertures are formed in the clutch sleeve, each of the collar securing apertures extending in a direction that is transverse to a longitudinal axis of the clutch sleeve and being configured to receive a collar securing pin, the collar securing pins cooperating with the clutch sleeve to limit movement of the adjustment collar along the clutch sleeve in a predetermined direction.

4. The hand-held power tool of claim 3, wherein each of the collar securing pins is an opposite leg of a clip, the clip including a base portion having opposite ends, each opposite end being coupled to an associated one of the legs.

5. The hand-held power-tool of claim 4, wherein the clutch sleeve includes a slot that is configured to receive the base portion of the clip when the legs of the clip are inserted to the collar securing apertures.

6. The hand-held power tool of claim 3, wherein the collar securing pins are generally cylindrical in shape.

7. The hand-held power tool of claim 1, wherein each of the second tabs is a container-like structure having an two spaced apart wall members, which extend outwardly from the other one of the gear case and the clutch sleeve, and an outer wall member that is spaced outwardly from the other one of the gear case and the clutch sleeve and interconnects the two spaced apart wall members.

8. The hand-held power tool of claim 7, wherein the pin apertures extend completely through the two spaced apart wall members.

9. The hand-held power tool of claim 1, wherein the coupling recess is generally U-shaped.

10. The hand-held power tool of claim 1, wherein the pin members are generally cylindrically shaped.

11. A hand-held power tool comprising:
    a housing defining a handle;
    a motor disposed in the housing;
    a multi-speed transmission having a gear train that is associated with the motor the gear train being operable for performing a speed reduction and torque multiplication function; and
    a clutch having a clutch member, an engagement member, a clutch plate, a clutch spring and an adjustment collar, the clutch member being associated with the multi-speed transmission and including a clutch face, the adjustment collar compressing the clutch spring against the clutch plate to bias the engagement member into engagement with the clutch face to thereby resist rotation of the clutch member, the clutch plate being unitarily formed to include an annular plate member and a plurality of leg members that extend generally perpendicularly from the annular plate member, each of the leg members being associated with a corresponding one of the engagement members.

12. The hand-held power tool of claim 11, wherein each of the engagement members is a spherical ball.

13. The hand-held power tool of claim 12, wherein each of the leg members terminates at a spherical recess that is configured to at least partially receive an associated one of the spherical balls.

14. The hand-held power tool of claim 11, wherein each of the leg members has a generally cylindrical shape.

15. The hand-held power tool of claim 11, wherein the clutch plate and the engagement members are unitarily formed.

16. The hand-held power tool of claim 15, wherein the engagement members are spherical protrusions formed on an end of the legs opposite the annular plate member.

17. A hand-held power tool comprising:
    a housing defining a handle:
    a motor disposed in the housing;
    a multi-speed transmission having a gear train that is associated with the motor the gear train being operable for performing a speed reduction and torque multiplication function, the gear train including a planetary gear set having a ring gear; and
    a clutch having a clutch member, a clutch sleeve, an engagement member, a clutch plate, a clutch spring and an adjustment collar, the clutch member being fixedly coupled to the ring gear and including a clutch face, the clutch sleeve supporting the clutch spring and the adjustment collar, the adjustment collar threadably engaging the clutch sleeve and compressing the clutch spring against the clutch plate to bias the engagement member into engagement with the clutch face to thereby resist rotation of the clutch member;

wherein the clutch plate is unitarily formed and includes an annular plate member and a plurality of leg members that extend generally perpendicularly from the annular plate member, each of the leg members being associated with a corresponding one of the engagement members and extending through the clutch sleeve.

18. The hand-held power tool of claim 17 wherein the ring gear and the clutch member are unitarily formed.

* * * * *